US010129209B2

United States Patent
Wang et al.

(10) Patent No.: US 10,129,209 B2
(45) Date of Patent: Nov. 13, 2018

(54) METHOD AND COMMUNICATION DEVICE FOR NETWORK ADDRESS TRANSLATION TRAVERSAL

(71) Applicant: INDUSTRIAL TECHNOLOGY RESEARCH INSTITUTE, Hsinchu (TW)

(72) Inventors: Ching-Yao Wang, Zhubei (TW); Lyu-Han Chen, Taoyuan (TW); Hung-Wei Lin, Taibao (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 287 days.

(21) Appl. No.: 15/051,298

(22) Filed: Feb. 23, 2016

(65) Prior Publication Data

US 2017/0118170 A1    Apr. 27, 2017

(30) Foreign Application Priority Data

Oct. 22, 2015  (TW) .............................. 104134648 A

(51) Int. Cl.
*H04L 29/08* (2006.01)
*H04L 29/12* (2006.01)
*G06F 15/16* (2006.01)

(52) U.S. Cl.
CPC ...... *H04L 61/2589* (2013.01); *H04L 61/2514* (2013.01); *H04L 61/2517* (2013.01); *H04L 61/2575* (2013.01); *H04L 67/104* (2013.01)

(58) Field of Classification Search
CPC ............. H04L 61/2514; H04L 61/2517; H04L 61/2575; H04L 61/2589; H04L 67/104

(Continued)

(56) References Cited

U.S. PATENT DOCUMENTS 7,328,280 B2 * 2/2008 Takeda .............. H04L 29/12066
709/220
7,751,387 B2 7/2010 Hwang et al.
(Continued)

FOREIGN PATENT DOCUMENTS

CN  101374141 A  2/2009
CN  101431511 A  5/2009

(Continued)

OTHER PUBLICATIONS

Cuevas et al., "A collaborative P2P scheme for NAT Traversal Server discovery based on topological information", Computer Networks, vol. 54, 2010, pp. 2071-2085.

(Continued)

*Primary Examiner* — Moustafa M Meky
*Assistant Examiner* — Thorne E Waugh
(74) *Attorney, Agent, or Firm* — Birch, Stewart, Kolasch & Birch, LLP

(57) ABSTRACT

A method and a communication device for network address translation (NAT) traversal is provided. The method includes following steps. A NAT device information is exchanged between a communication device and another communication device. A relay connection is established between the communication device and the another communication device through a relay server. Whether it is feasible to establish a P2P connection between the communication device and the another communication device is determined according to the NAT device information. When it is feasible to establish the P2P connection between the communication device and the another communication device, an attempt to establish the P2P connection between the communication device and the another communication device is made. If the P2P connection is not established successfully, an attempt to establish the P2P connection (Continued)

between the communication device and the another communication device is made again.

20 Claims, 7 Drawing Sheets

(58) Field of Classification Search
USPC .................................................. 709/203–248
See application file for complete search history.

(56) References Cited

U.S. PATENT DOCUMENTS

| | | | |
|---|---|---|---|
| 8,200,841 B2 | 6/2012 | Kudo | |
| 8,412,833 B2 | 4/2013 | Vyrros et al. | |
| 8,489,701 B2* | 7/2013 | Manion | H04L 12/4641 709/217 |
| 8,499,083 B2* | 7/2013 | Tanimoto | H04L 67/1095 709/223 |
| 8,819,244 B2 | 8/2014 | Tung et al. | |
| 9,497,160 B1* | 11/2016 | Diffie | H04L 61/2521 |
| 9,762,508 B2* | 9/2017 | Kaufman | H04L 49/15 |
| 2004/0139228 A1 | 7/2004 | Takeda et al. | |
| 2009/0216887 A1 | 8/2009 | Hertle et al. | |
| 2011/0055392 A1 | 3/2011 | Shen et al. | |
| 2011/0264739 A1* | 10/2011 | Wang | H04L 29/1249 709/204 |
| 2012/0042027 A1 | 2/2012 | Abuan et al. | |
| 2014/0052870 A1 | 2/2014 | Abuan et al. | |
| 2014/0379791 A1 | 12/2014 | Chaturvedi et al. | |
| 2015/0022666 A1* | 1/2015 | Kay | H04L 67/025 348/159 |
| 2015/0113154 A1 | 4/2015 | Nguyen et al. | |

FOREIGN PATENT DOCUMENTS

| | | | |
|---|---|---|---|
| TW | 200937923 A | 9/2009 | |
| TW | 201521392 A | 6/2015 | |

OTHER PUBLICATIONS

Dowling et al., "Improving ICE Service Selection in a P2P System using the Gradient Topology", IEEE, First International Conference on Self-Adaptive and Self-Organizing Systems (SASO 2007), 2007, pp. 1-4.
Ford et al., "Peer-to-Peer Communication Across Network Address Translators", USENIX Association, USENIX Annual Technical Conference, 2005, 14 pages.
Guha et al., "NUTSS: A SIP-based Approach to UDP and TCP Network Connectivity", SIGCOMM'04 Wokshops, Aug. 30+Sep. 3, 2004, pp. 1-6.
J. Rosenberg, "Interactive Connectivity Establishment (ICE): A Protocol for Network Address Translator (NAT) Traversal for Offer/Answer Protocols", Internet Engineering Task Force (IETF), RFC 5245, Standards Track, Apr. 2010, pp. 1-117.
Zhang et al., "Using P2P Network to Transmit Media Stream in SIP-based System", IEEE, The 9th International Conference for Young Computer Scientists, 2008, pp. 362-367.

* cited by examiner

METHOD AND COMMUNICATION DEVICE FOR NETWORK ADDRESS TRANSLATION TRAVERSAL

CROSS-REFERENCE TO RELATED APPLICATION

This application claims the benefit of Taiwan application Serial No. 104134648, filed Oct. 22, 2015, the disclosure of which is incorporated by reference herein in its entirety.

TECHNICAL FIELD

The disclosure relates in general to a method and a device for NAT traversal.

BACKGROUND

To resolve the shortage of Internet protocol (IP) address, increase network security, and block malicious activities coming from the hosts of external networks, most networking equipment is connected to an external network or another networking equipment through a network address translation (NAT) device. An NAT device may be a device implementing at least NAT. However, data transfer between one networking equipment and another networking equipment may fail if the NAT device cannot be traversed. Therefore, NAT traversal has become a crucial issue to be resolved. According to a method, NAT traversal is achieved through a relay server. Such method has higher transmission success rate but lower transmission efficiency and incurs higher transmission cost. For example, extra bandwidth or longer transmission time is required. According to another method, NAT traversal is achieved through a peer-to-peer (P2P) connection. Such method has better transmission efficiency and requires less bandwidth. However, when the method is used in an NAT device implementing symmetric NAT, transmission success rate is low. Therefore, it has become a prominent task for the industries to provide a method for NAT traversal which produces higher transmission efficiency, incurs lower transmission cost and achieves higher transmission success rate.

SUMMARY

According to one embodiment, a method for network address translation (NAT) traversal is provided. The method is used in a communication device correspondingly connected to an NAT device. The method includes following steps. An NAT device information is exchanged between a communication device and another communication device. A relay connection is established between the communication device and the another communication device through a relay server. Whether it is feasible to establish a P2P connection between the communication device and the another communication device is determined according to the NAT device information. When it is feasible to establish the P2P connection between the communication device and the another communication device, an attempt of establishing the P2P connection between the communication device and the another communication device is made. If the P2P connection is not established successfully, an attempt of establishing the P2P connection between the communication device and the another communication device is made again.

According to another embodiment, a communication device for NAT traversal is provided. The communication device is correspondingly connected to a first NAT device. The communication device includes a communication unit and a processing unit. The processing unit is coupled to the communication unit for controlling the communication unit to execute following steps. The communication unit exchanges an NAT device information with another communication device. The communication unit establishes a relay connection with the another communication device through a relay. The communication unit determines whether it is feasible to establish a P2P connection with the another communication device according to the NAT device information. If it is feasible to establish the P2P connection, the communication unit makes an attempt of establishing the P2P connection with the another communication device. If the P2P connection is not established successfully, the communication unit makes an attempt of establishing the P2P connection with the another communication device again.

The above and other aspects of the invention will become better understood with regard to the following detailed description of the preferred but non-limiting embodiment(s). The following description is made with reference to the accompanying drawings.

Figure 1:
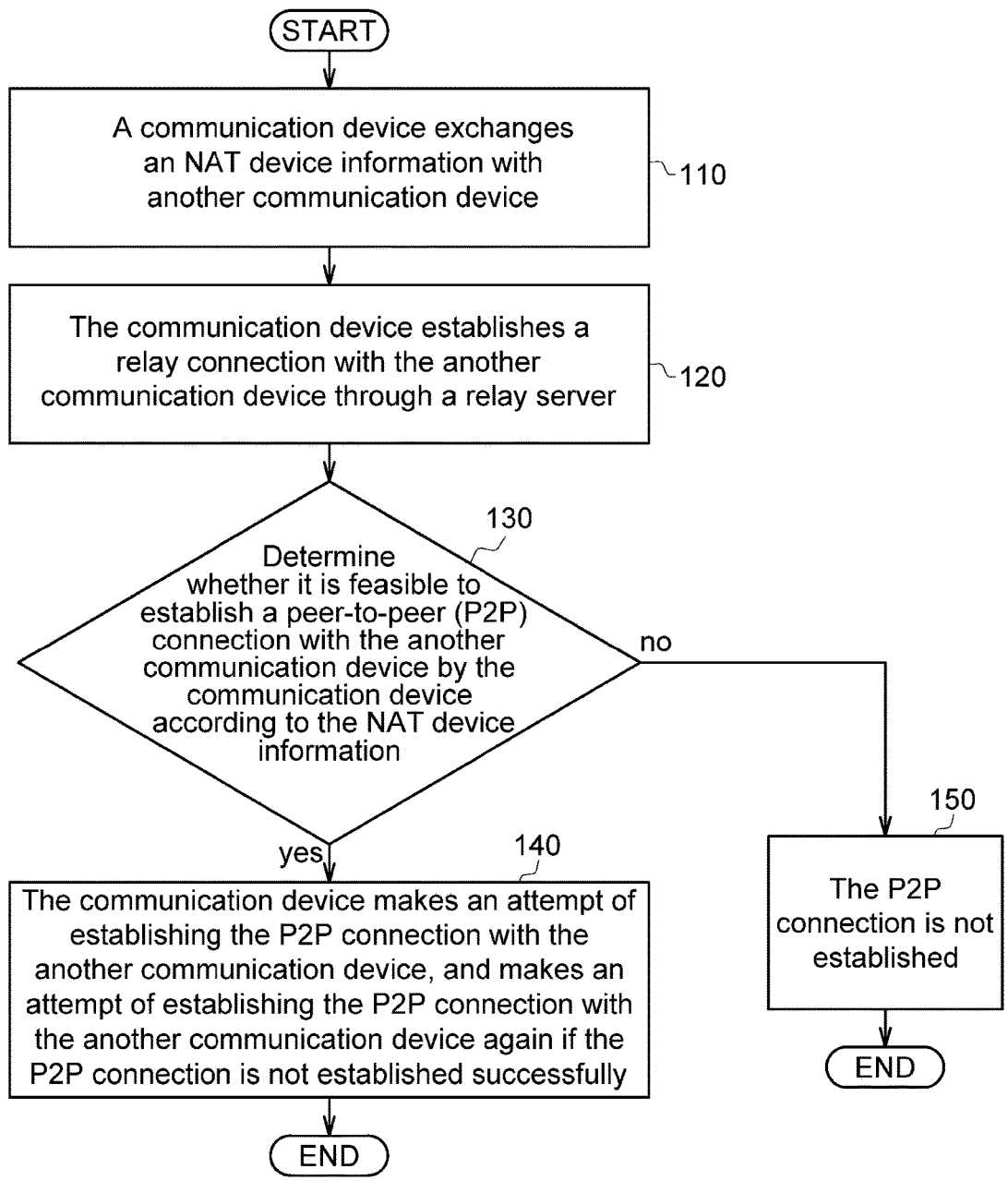
FIG. 1 is a flowchart of a method for NAT traversal according to a first embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

FIG. 1 is a flowchart of a method for network address translation (NAT) traversal according to a first embodiment of the present disclosure. The present embodiment is exemplified by a communication device correspondingly connected to an NAT device by way of wired or wireless connection such as Internet or wireless local area network (WLAN), but the present disclosure is not limited to. The method includes following steps. Firstly, the method begins at step 110, an NAT device information is exchanged between a communication device and another communication device. Then, the method proceeds to step 120, a relay connection between the communication device and the another communication device is established through a relay server, and the communication device starts to transmit data to the another communication device through the relay connection. Then, the method proceeds to step 130, whether it is feasible to establish a peer-to-peer (P2P) connection between the communication device and the another communication device is determined according to the NAT device information. Lastly, if it is feasible to establish the P2P connection between the communication device and the another communication device, the method proceeds to step 140, an attempt of establishing the P2P connection between the communication device and the another communication device is made, such that data can be transmitted to the another communication device through the P2P connection. If the P2P connection is not established successfully, an attempt of establishing the P2P connection between the communication device and the another communication device is made again. On the other hand, if it is determined in step 130 that is not feasible to establish the P2P connection between the communication device and the another communication device, then the P2P connection is not established as shown in step 150.

In the present embodiment, a relay connection with higher transmission success rate is established first, and an attempt of establishing the P2P connection with higher transmission efficiency and lower transmission cost is made afterwards. Since the relay connection with higher transmission success rate is established first, the user can transmit data through the relay connection without waiting the attempt of establishing the P2P connection. In the present embodiment, after it is determined that it is feasible to establish the P2P connection but the P2P connection is not successfully established, the attempt of establishing the P2P connection is continuously made. That is, the P2P connection with higher transmission efficiency and lower transmission cost is used as long as the condition allows.

Figure 2A:
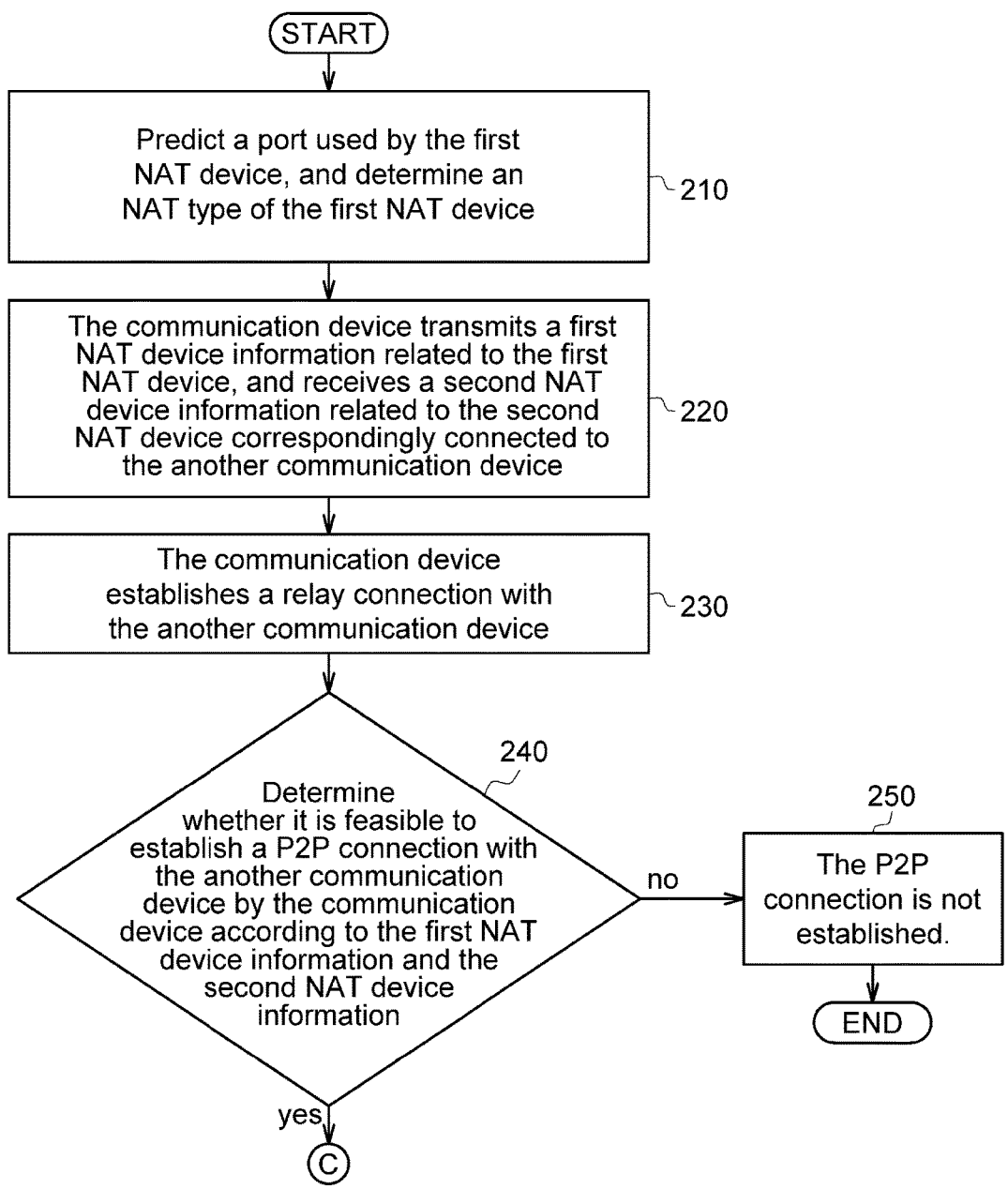
FIGS. 2A, 2B and 2C are flowcharts of a method for NAT traversal according to a second embodiment of the present disclosure.
Figure 2B:
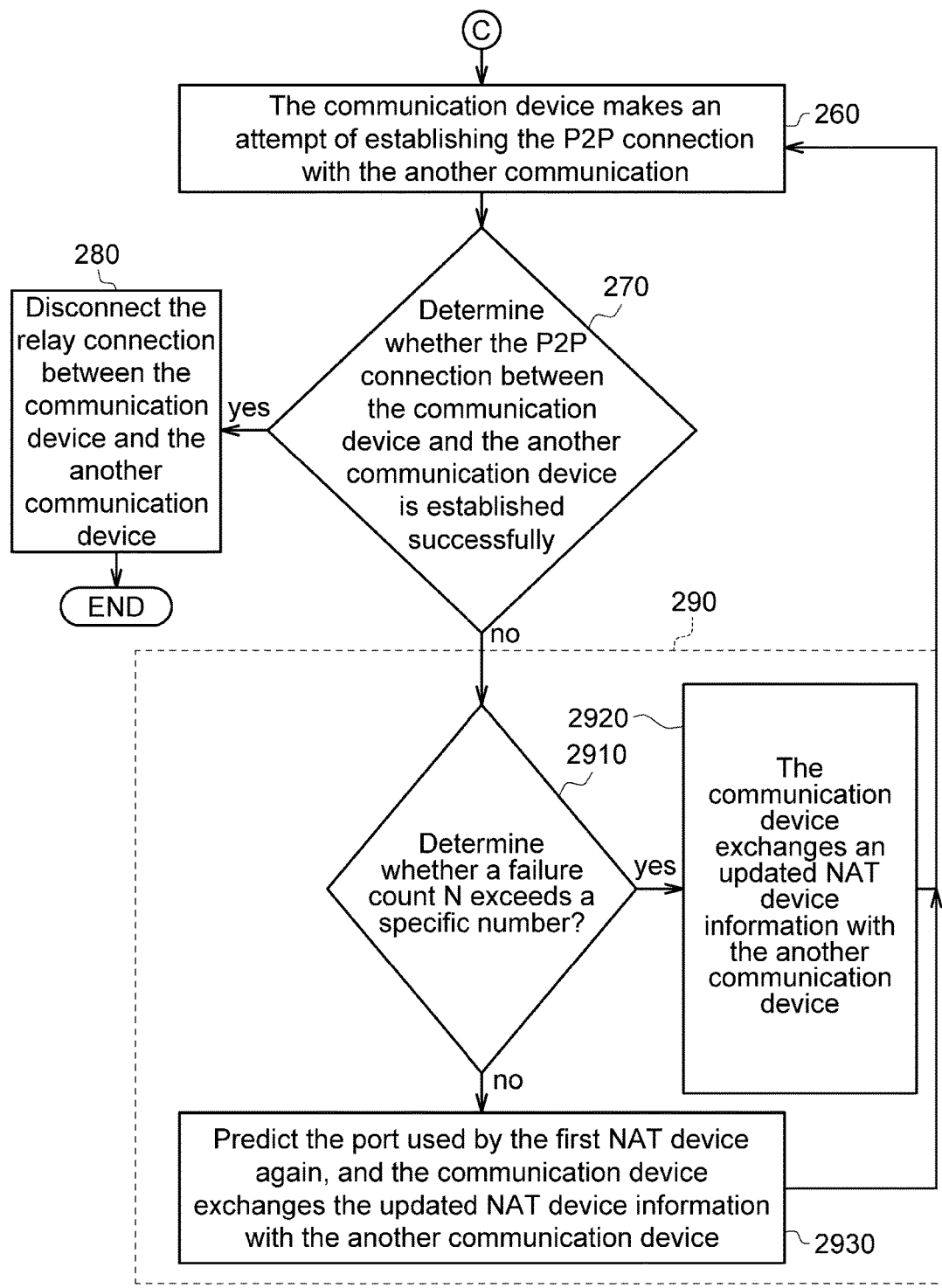
Figure 2C:
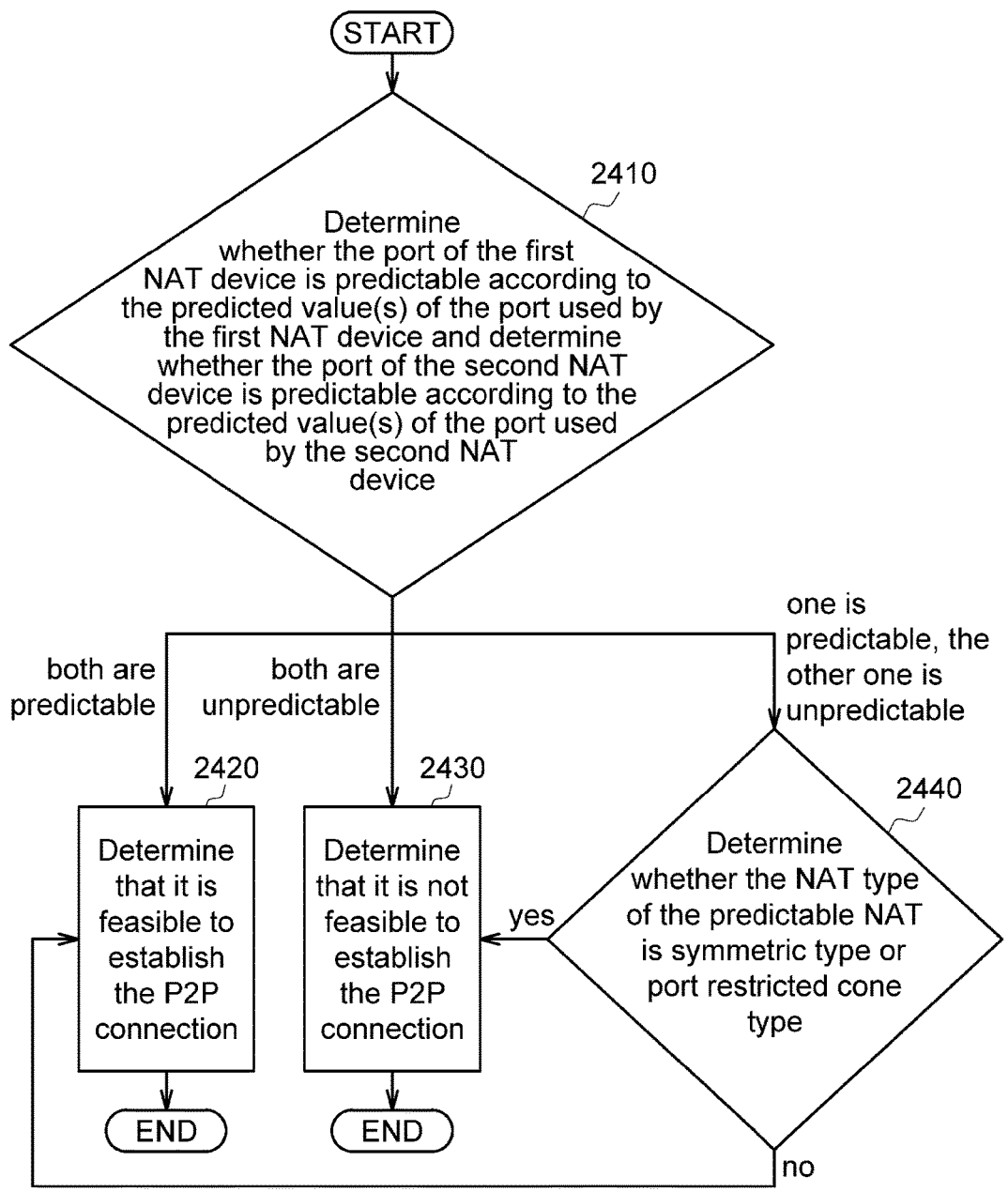

FIGS. 2A, 2B and 2C are flowcharts of a method for NAT traversal according to a second embodiment of the present disclosure. The method is used in a communication device capable of transmitting data with another communication device. The communication device is correspondingly connected to a first NAT device, and the another communication device is correspondingly connected to a second NAT device. In the present embodiment, the method begins at step 210, a port used by the first NAT device is predicted by the communication device, and an NAT type of the first NAT device is determined by the communication device. In one embodiment, similarly, a port used by the second NAT device is predicted by the another communication device, and an NAT type of the second NAT device is determined by the another communication device. Then, the method proceeds to step 220, a first NAT device information related to the first NAT device is transmitted by the communication device, and a second NAT device information related to the second NAT device correspondingly connected to the another communication device is received by the communication device. The first NAT device information includes, for example, a local Internet protocol (IP) address of the communication device, a local port of the communication device, a public IP address of the first NAT device, a public port used by the first NAT device, and/or the NAT type of the first NAT device. Likewise, the second NAT device information includes, for example, a local IP address of the another communication device, a local port of the another communication device, a public IP address of the second NAT device, a the public port used by the second NAT device, and/or the NAT type of the second NAT device. Then, the method proceeds to step 230, a relay connection between the communication device and the another communication device is established, and the communication device starts to transmit data to the another communication device through the relay connection. Then, the method proceeds to step 240, whether it is feasible to establish a P2P connection between the communication device and the another communication device is determined according to the first NAT device information and the second NAT device information. If it is determined in step 240 that it is not feasible to establish the P2P connection between the communication device and the another communication device, then the P2P connection is not established as shown in step 250.

If it is determined that it is feasible to establish the P2P connection between the communication device and the another communication device, then the method proceeds to step 260, an attempt of establishing the P2P connection between the communication device and the another communication device is made. Then, the method proceeds to step 270, whether the P2P connection between the communication device and the another communication device is established successfully is determined. If the P2P connection is established successfully, then the method proceeds to step 280, the relay connection between the communication device and the another communication device is disconnected.

However, if the P2P connection is not established successfully (i.e., the establishment of the P2P connection is failed), the method proceeds to step 290, an attempt of establishing the P2P connection between the communication device and the another communication device is made again. In some embodiments, step 290 may include several sub-steps. Firstly, step 290 begins at step 2910, whether a failure count N exceeds a specific number is determined, wherein the failure count N is a count of failing to establishing the P2P connection. The specific number, for example, may be 5. In one embodiment, step 2910 may be determined by an formula such as N % 10>5, which means whether the remainder of N being divided by 10 is larger than 5. If the failure count N exceeds the specific number (e.g., N>5 or N % 10>5), the method proceeds to step 2920, an updated NAT device information is exchanged between the communication device and the another communication device. The updated NAT device information may include a updated first NAT device information and/or a updated second NAT device information. The updated first NAT device information may include the local IP address of the communication device and the local port of the communication device, and the updated second NAT device information may include the local IP address of the another communication device and the local port of the another communication device. In another embodiment, since the local IP addresses and the local ports have been exchanged in step 220, if the failure count exceeds the specific number, the method can skip step 2920 and directly proceed to step 260. After step 2920 is executed or skipped, the communication device executes step 260, that is, the communication device makes an attempt of establishing the P2P connection with the another communication device according to the updated NAT device information. By exchanging the updated NAT device information (including local IP address and local port) between the communication device and the another communication device, the method resolves the problem of failing to establish connection through the public IP address of the NAT device if both the communication device and the another communication device are connected to the same NAT device but the NAT device (or IP router) connected to the two communication devices does not support the loopback mechanism. Therefore, the use of the local IP addresses of the communication devices increase the transmission success rate of establishing the P2P connection.

If the failure count in establishing the P2P connection does not exceed the specific number, the method proceeds to step 2930, the port used by the first NAT device is predicted again, and an updated first NAT device information is exchanged between the communication device and the another communication device, wherein the updated first NAT device information includes the re-predicted port used by the first NAT device. In one embodiment, similarly, the port used by the second NAT device is predicted again, and an updated second NAT device information is exchanged between the communication device and the another communication device, wherein the updated second NAT device information includes the re-predicted port used by the second NAT device. Then, the communication device proceeds to step 260, the P2P connection between the communication device and the another communication device is established according to the updated NAT device information. By predicting the port used by the first NAT device and/or the port used by the second NAT device again, the problem of connection failure caused by incorrect prediction of the port or the predicted port being occupied may be resolved. Therefore, the use of the re-predicted port increases the success rate of establishing the P2P connection.

Also, refer to FIG. 2C, a flowchart of the step 240 of FIG. 2A for determining the feasibility of establishing the P2P connection is shown. In one embodiment, step 240 may include several sub-steps to determine the feasibility of establishing the P2P connection. Firstly, the process begins at step 2410, whether the port of the first NAT device is predictable is determined according to the predicted value(s) of the port used by the first NAT device predicted in the step 210, and whether the port of the second NAT device is predictable is determined according to the predicted value(s) of the port used by the second NAT device predicted in the step 210. If it is determined in step 2410 that the port used by the first NAT device and the port used by the second NAT device are both predictable, the method proceeds to step 2420. In step 2420, it is determined that it is feasible to establish the P2P connection. If it is determined in step 2410 that the port used by the first NAT device and the port used by the second NAT device are both unpredictable, the method proceeds to step 2430. In step 2430, it is determined that it is not feasible to establish the P2P connection. If it is determined in step 2410 that one of the two ports used by the two NAT devices (i.e., the first NAT device and the second NAT device) is predictable but the other one is unpredictable, the method proceeds to step 2440. In step 2440, whether the NAT type of the predictable NAT device is symmetric type or port restricted cone type is determined. If it is determined in step 2440 that the NAT type of the predictable NAT device is symmetric type or port restricted cone type, the method proceeds to step 2430, it is determined that it is not feasible to establish the P2P connection. If it is determined in step 2440 that the NAT type of the predictable NAT device is not symmetric type and is not port restricted cone type, that is, the NAT type of the predictable NAT device is full cone type or address restricted cone type, the method proceeds to step 2420, it is determined that it is feasible to establish the P2P connection.

Table 1 lists the feasibility of establishing the P2P connection according to the predictability of the port of the first NAT device, the predictability of the port of the second NAT device, the NAT type of the first NAT device, and the NAT type of the second NAT device. As indicated in the second row of Table 1, if both the ports used by the two NAT devices (i.e., the first NAT device and the second NAT device) are predictable, it is determined as feasible to establish the P2P connection between the two communication devices (i.e., the communication device and the another communication device) regardless of the NAT types of the two NAT devices. As indicated in the third row of Table 1, if both the ports used by the two NAT devices are unpredictable, the NAT types of the two NAT devices are determined as symmetric type, and it is determined as infeasible to establish the P2P connection between the two communication devices. However, if one of the ports used by the two NAT devices is predictable but the other is unpredictable, the feasibility of establishing the P2P connection is determined according to the NAT types of the two NAT device. Under such circumstance, if the port is unpredictable, the NAT type of the NAT device is determined as symmetric; if the port is predictable, the NAT type of the NAT device having a predictable port has four possibilities, namely, full cone, address restricted cone, port restricted cone and symmetric, as shown in the 4-th to the 7-th row of Table 1. If the NAT type of the NAT device having a predictable port is full cone or address restricted cone, it is determined that it is feasible to establish the P2P connection between the two communication devices. If the NAT type of the NAT device having a predictable port is port restricted cone or symmetric, it is determined that it is not feasible to establish the P2P connection between the two communication devices.

TABLE 1

| Port of one NAT device; Type of one NAT device | Port of the other NAT device; Type of the other NAT device | Feasibility of P2P connection |
|---|---|---|
| Predictable; Any type | Predictable; Any type | Feasible |
| Unpredictable; Symmetric | Unpredictable; Symmetric | Infeasible |
| Unpredictable; Symmetric | Predictable; Full cone | Feasible |
| Unpredictable; Symmetric | Predictable; Address restricted cone | Feasible |
| Unpredictable; Symmetric | Predictable; Port restricted cone | Infeasible |
| Unpredictable; Symmetric | Predictable; Symmetric | Infeasible |

Figure 3A:
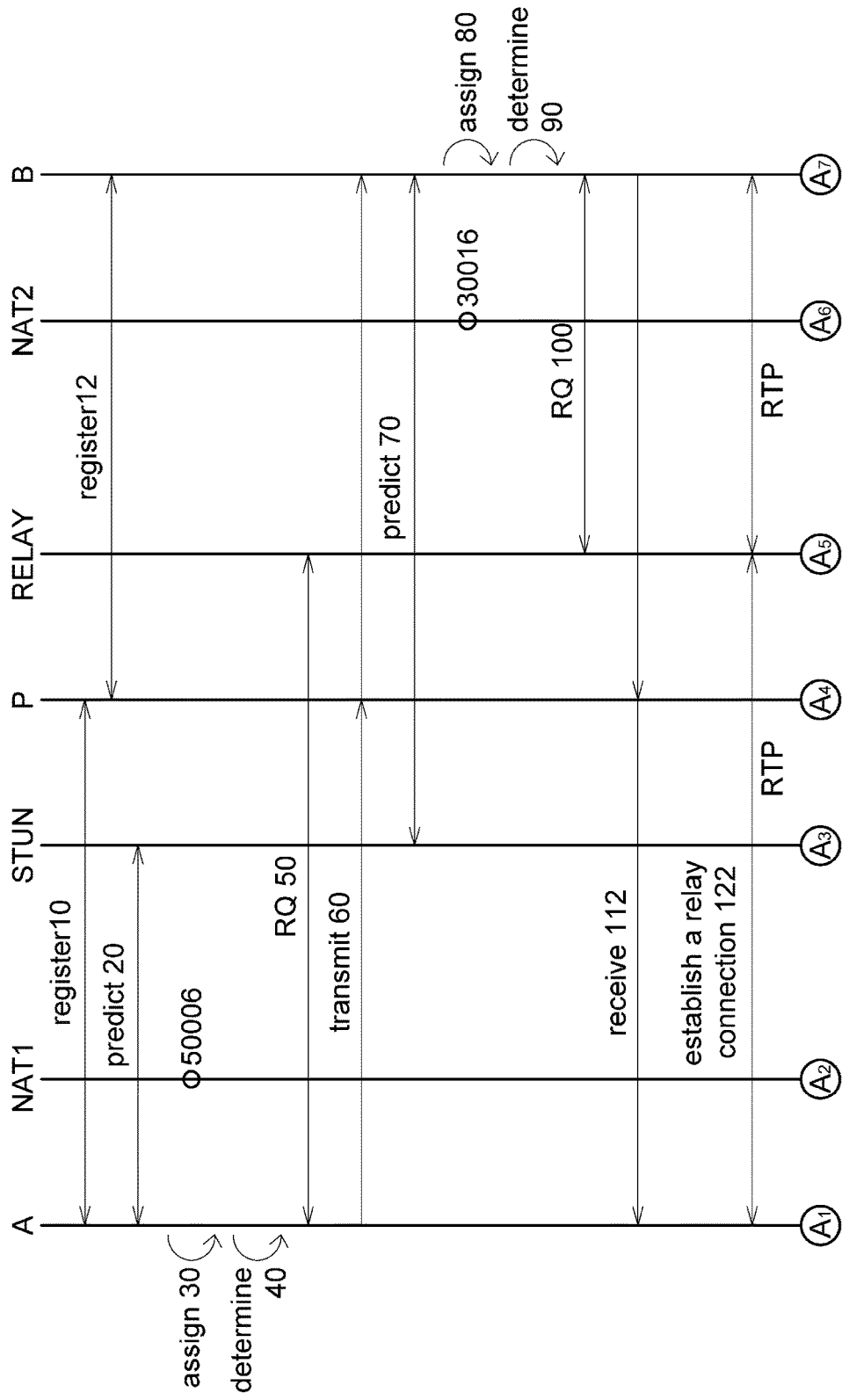
FIG. 3A and FIG. 3B are schematic diagrams of a method for NAT traversal according to another embodiment of the present disclosure.
Figure 3B:
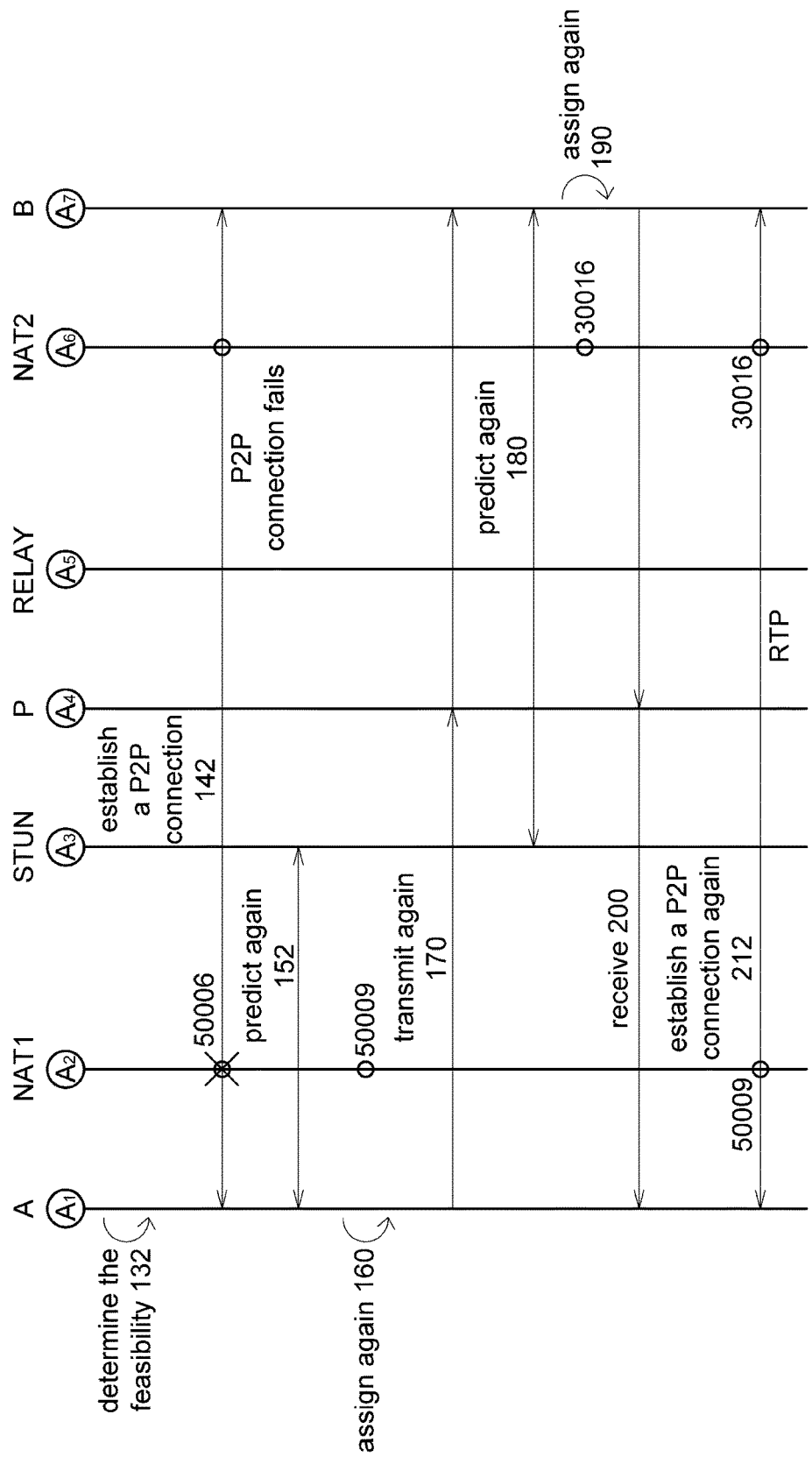

The method for NAT traversal of the present disclosure is exemplified in an example below. Referring to FIG. 3A and FIG. 3B, schematic diagrams of a method for NAT traversal according to another embodiment of the present disclosure are shown. Firstly, the method is used for transmitting data between communication devices A and B, wherein the communication device A is correspondingly connected to the first NAT device NAT1, and the communication device B is correspondingly connected to the second NAT device NAT2. In the present embodiment, the network environment further includes session traversal utilities for NAT server (referred as STUN server hereinafter), a proxy P, and a relay server RELAY. In some embodiments, the STUN server and the relay server can be integrated as one device. In some embodiments, the STUN server, the proxy and the relay server can be integrated as one device.

The method for NAT traversal of the present disclosure includes following steps. Firstly, the method begins at step 10, the communication device A registers to the proxy P. Similarly, in step 12, the communication device B also registers to the proxy P. Then, the method proceeds to step 20, the communication device A transmits a request to the STUN server, and the STUN server transmits the public IP address of the first NAT device NAT1 and the public port used by the first NAT device NAT1 back to the communication device A, which accordingly makes an attempt of predicting the next public port used by the first NAT device NAT1 according to the received information.

Details of step 20 of predicting the next public port used by the first NAT device NAT1 are exemplified below with four examples. Refer to Table 2. Table 2 lists the value of the public port received by the communication device A after transmitting packets to 4 servers. For example, the communication device A transmits a request to the STUN servers through a local port 10000 to make an attempt of predicting the next public port used by the first NAT device NAT1. In the said example, the request includes transmitting four packets to four STUN servers (STUN 1~STUN 4), respectively. Then, the four STUN servers (STUN 1~STUN 4) respectively transmit the values of the public ports used by the first NAT device NAT1 back to the communication device A. In example 1, all the values of the public ports transmitted back to the communication device A by the four STUN servers are 10000. Therefore, in example 1, the public port is predictable, and the predicted value of the next public port is also 10000. Similarly, in example 2, all the values of the public ports transmitted back to the communication device A by the four STUN servers are 38792. Therefore, in example 2, the public port is predictable, and the predicted value of the next public port is also 38792. In example 3, the values of the public ports transmitted back to the communication device A by the four STUN servers are different. That is, the first NAT device NAT1 of example 3 is symmetric. Although the first NAT device NAT1 of example 3 is symmetric, the values of the public ports transmitted back to the communication device A by the four STUN servers are 40001, 40002, 40003 and 40004, respectively. That is, in example 3, since the value of the public port is regular, the value of the public port is still predictable, and the value of the next public port is predicted as 40005. Lastly, in example 4, the values of the public ports transmitted back to the communication device A by the four STUN servers are different, so the first NAT device NAT1 of example 4 is also symmetric. However, in example 4, the values of the public ports transmitted back to the communication device A by the four STUN servers are 45792, 38729, 52900 and 31803, respectively. That is, in example 4, since the value of the public port is random, the value of the public port is unpredictable. In the examples in Table 2, the request may include transmitting four packets to four STUN servers. However, the number of packets and the number of requests are not limited in the disclosure, and anyone skilled in the technology can transmit as many packets or requests as required until the prediction is successful.

TABLE 2

| Server | Value of the public port of Example 1 | Value of the public port of Example 2 | Value of the public port of Example 3 | Value of the public port of Example 4 |
|---|---|---|---|---|
| STUN 1 | 10000 | 38792 | 40001 | 45792 |
| STUN 2 | 10000 | 38792 | 40002 | 38729 |
| STUN 3 | 10000 | 38792 | 40003 | 52900 |
| STUN 4 | 10000 | 38792 | 40004 | 31803 |

Then, in step 30, the communication device A assigns the result of prediction in step 20 as the predicted value. For example, the next public port used by the first NAT device NAT1 is predicted as 50006. If it is determined in step 20 that the next public port used by the first NAT device NAT1 is unpredictable, the predicted value can be assigned as 0 in step 30. Then, the method proceeds to step 40, the NAT type of the first NAT device NAT1 correspondingly connected to the communication device A is determined. For example, the communication device A can transmit several requests to a particular port of STUN server through the first NAT device NAT1, and requests the STUN server to transmit back the public port used by the first NAT device NAT1 through the original port or a different port. The NAT type of the NAT device can be determined according to whether the communication device A can receive the information from the STUN server or not. Then, the method proceeds to step 50, the communication device A transmits a request RQ to the relay server RELAY to establish connection with the relay server RELAY. Then, the method proceeds to step 60, the communication device A transmits the information related to the first NAT device NAT1 to the communication device B through the proxy P. The information related to the first NAT device NAT1 includes local IP address of the communication device A, the port used by the communication device A, public IP address of the first NAT device NAT1, the predicted value of the next public port used by the first NAT device NAT1 and the NAT type of the first NAT device NAT1.

Then, when the communication device B receives information and connection request from the communication device A, the communication device B may executes similar steps. In step 70, the communication device B transmits a request to the STUN server to make an attempt of predicting the next public port used by the second NAT device NAT2. The predicting method of the next public port used by the second NAT device NAT2 is similar to the predicting method of the next public port used by the first NAT device NAT1. Similarly, the number of packets and the number of requests are not limited in the disclosure, and anyone skilled in the technology can transmit as many packets or requests as required until the prediction is successful. In step 80, the communication device B assigns the result of prediction in step 70 as the predicted value. For example, the next public port used by the second NAT device NAT2 is predicted as 30016. In step 90, the NAT type of the second NAT device NAT2 is determined. In step 100, the communication device B transmits a request RQ to the relay server RELAY to establish connection with the relay server RELAY. Lastly, the method proceeds to step 112, the communication device A receives the information related to the second NAT device NAT2 from the communication device B through the proxy P. Similarly, the information related to the second NAT device NAT2 include local IP address of the communication device B, the port used by the communication device B, public IP address of the second NAT device NAT2, the predicted value of the next public port used by the second NAT device NAT2 and the NAT type of the second NAT device NAT2. Then, after both the communication devices A and B receive the information related to the NAT devices NAT1 and NAT2, the method proceeds to step 122, a relay connection between the communication devices A and B through a relay server, and the communication device A starts to transmit data to the communication device B through the relay connection (real-time transport protocol, RTP).

Refer to FIG. 3B. After a relay connection is established between the communication devices A and B through the relay server RELAY, the method proceeds to step 132, the feasibility of establishing a P2P connection between the communication devices A and B is determined. If it is feasible to establish the P2P connection between the communication devices A and B, the method proceeds to step 142, an attempt of establishing the P2P connection between the communication devices A and B is made. If the public port 50006 used in the first NAT device NAT1 is occupied or the prediction is incorrect, the P2P connection between the communication devices A and B would not be established successfully. For example, the communication device A does not receive any packets from the communication device B. Meanwhile, the method proceeds to step 152, the communication device A transmits a request to the STUN server again to predict the next public port used in the first NAT device NAT1 again. In step 160, the updated predicted value of the first NAT device NAT1 is, for example, assigned as 50009. Then, the method proceeds to step 170, the communication device A transmits the updated information related to the first NAT device NAT1 again to the communication device B. The updated information related to the first NAT device NAT1 include the updated predicted value of the public port 50009.

In step 180, the communication device B transmits a request to the STUN server again to predict the next public port used by the second NAT device NAT2 again. In step 190, the communication device B assigns an updated predicted value of the public port used in the second NAT device NAT2. In the present example, the NAT type of the second NAT device NAT2 is, for example, full cone, address restricted cone or port restricted cone. That is, the public port used in such NAT types of NAT device does not change, and the next public port used in the second NAT device NAT2 is still 30016. In step 200, the communication device A again receives the information related to the second NAT device NAT2 from the communication device B. Lastly, after both the communication devices A and B receive the updated information related to the NAT devices NAT1 and NAT2, the method proceeds to step 212. In step 212, the communication device A again makes an attempt of establishing the P2P connection with the communication device B according to the updated information related to the NAT devices NAT1 and NAT2. If the P2P connection is established successfully, the communication device A can transmit data (RTP) to the communication device B through the P2P connection and disconnect the relay connection between the communication devices A and B. In the above embodiments, the sequence of steps is for exemplary and explanatory purpose only, not for limiting the implementation of the present disclosure. Based on actual needs, the sequence of steps disclosed above can be adjusted and some steps can be selectively repeated.

Figure 4:
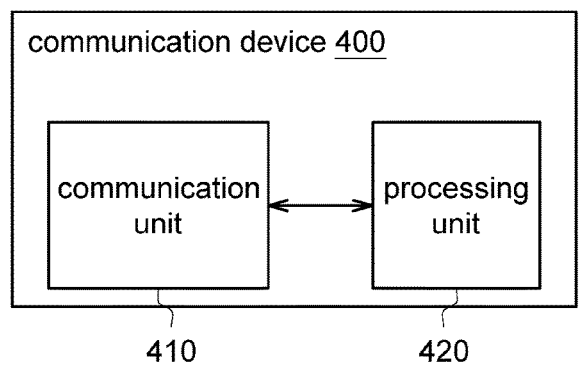
FIG. 4 is a block diagram of a communication device for NAT traversal according to another embodiment of the present disclosure.

The present disclosure provides a communication device capable of executing the method for NAT traversal disclosed in the above embodiments. FIG. 4 is a block diagram of a communication device 400 for NAT traversal according to another embodiment of the present disclosure. The communication device 400 is correspondingly connected to the NAT device. The communication device 400 includes a communication unit 410 and a processing unit 420. The communication device 400 can be realized by such as a server, a computer, a laptop computer, a tablet PC, a mobile phone, a smart TV, or a device connected to the Internet. The communication unit 410 can be realized by way of hardware circuits or software, and can communicate with another device through the Internet. The processing unit 420 can be implemented by way of hardware such as a central processing unit (CPU), a microprocessor, a macro processor, or an application specific integrated circuit (ASICs), several digital logic gates, or other circuit configuration, or by way of software. The processing unit 420 is coupled to the communication unit 410 for controlling the communication unit 410 to execute following steps. The communication unit 410 exchanges an NAT device information with another communication device. The communication unit 410 establishes a relay connection with the another communication device through a relay. The processing unit 420 further controls the communication unit 410 to determine the feasibility of establishing a P2P connection between the communication unit 410 and the another communication device according to the NAT device information. If it is feasible to establish the P2P connection between the communication unit 410 and the another communication device, then the communication unit 410 makes an attempt of establishing the P2P connection with the another communication device. If the P2P connection is not established successfully, the communication unit 410 again makes an attempt of establishing the P2P connection with the another communication device.

The communication device 400 of the present disclosure can execute the steps in FIGS. 2A, 2B, and 2C, or the steps in FIG. 3 to traverse the NAT device. However, the communication device 400 of the present disclosure is not limited thereto, and the steps for NAT traversal can be adjusted according to actual needs.

According to the methods and devices for NAT traversal disclosed in above embodiments, a relay connection with higher transmission success rate is established first, and a P2P connection with higher transmission efficiency and lower transmission cost is established afterwards. The user does not need to spend time waiting for the attempt of establishing the P2P connection, and the P2P connection with higher transmission efficiency and lower transmission cost is used as long as the condition allows. The present disclosure has the effects of having higher transmission efficiency, incurring lower transmission cost and achieving higher transmission success rate.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for network address translation (NAT) traversal used in a communication device correspondingly connected to a first NAT device, wherein the method comprises:

exchanging a NAT device information with another communication device by the communication device;

establishing a relay connection with the another communication device through a relay server and performing data transmission through the relay connection by the communication device;

during data transmission through the relay connection, determining whether it is feasible to establish a peer-to-peer (P2P) connection with the another communication device by the communication device according to the NAT device information; and making an attempt to establish the P2P connection with the another communication device by the communication device if it is feasible to establish the P2P connection with the another communication device by the communication device, and the communication device makes an attempt to establish the P2P connection with the another communication device again if the P2P connection is not established successfully.

2. The method according to claim 1, wherein the step of exchanging the NAT device information with the another communication device by the communication device comprises:

transmitting, by the communication device, a first NAT device information related to the first NAT device; and
receiving, by the communication device, a second NAT device information related to a second NAT device correspondingly connected to the another communication device.

3. The method according to claim 2, further comprising:
predicting a first port used by the first NAT device to obtain a first predicted value;
determining a NAT type of the first NAT device;
predicting a second port used by the second NAT device to obtain a second predicted value; and
determining a NAT type of the second NAT device.

4. The method according to claim 3, wherein the first NAT device information comprises a local IP address of the communication device, a local port of the communication device, a public IP address of the first NAT device, the first predicted value of the first NAT device and the NAT type of the first NAT device, and the second NAT device information comprises a local IP address of the another communication device, a local port of the another communication device, a public IP address of the second NAT device, the second predicted value of the second NAT device and the NAT type of the second NAT device.

5. The method according to claim 3, wherein whether it is feasible to establish the P2P connection with the another communication device by the communication device is determined according to the first predicted value, the NAT type of the first NAT device, the second predicted value and the NAT type of the second NAT device.

6. The method according to claim 5, wherein the step of determining whether it is feasible to establish the P2P connection with the another communication device by the communication device comprises:
determining whether the first port is predictable according to the first predicted value; and
determining whether the second port is predictable according to the second predicted value;
wherein it is determined that it is feasible to establish the P2P connection if both the first port and the second port are predictable;
wherein it is determined that it is not feasible to establish the P2P connection if both the first port and the second port are unpredictable.

7. The method according to claim 6, wherein when one of the first port and the second port is predictable but the other is unpredictable, it is determined that it is not feasible to establish the P2P connection if the NAT type of the NAT device having a predictable port is symmetric or port restricted cone; and it is determined that it is feasible to establish the P2P connection if the NAT type of the NAT device having a predictable port is full cone or address restricted cone.

8. The method according to claim 1, wherein the step of making the attempt to establish the P2P connection with the another communication device again comprises:
exchanging a third NAT device information with the another communication device by the communication device, wherein the third NAT device information comprises a local IP address of the communication device and a local port of the communication device; and
making an attempt to establish the P2P connection with the another communication device by the communication device according to the third NAT device information.

9. The method according to claim 3, wherein the step of making the attempt to establish the P2P connection with the another communication device again comprises:
predicting the first port used by the first NAT device again to obtain a third predicted value;
exchanging a third NAT device information including the third predicted value with the another communication device by the communication device; and
making an attempt to establish the P2P connection with the another communication device by the communication device according to the third NAT device information.

10. The method according to claim 1, further comprising:
disconnecting the relay connection established between the communication device and the another communication device if the P2P connection is established successfully.

11. A communication device for network address translation (NAT) traversal, wherein the communication device is correspondingly connected to a first NAT device, and comprises:
a communication unit; and
a processing unit coupled to the communication unit;
wherein, the processing unit controls the communication unit to:
exchange a NAT device information with another communication device;
establish a relay connection with the another communication device through a relay server and perform data transmission through the relay connection;
during data transmission through the relay connection, determine whether it is feasible to establish a peer-to-peer (P2P) connection with the another communication device by the communication unit according to the NAT device information; and
make an attempt to establish the P2P connection with the another communication device by the communication unit if it is feasible to establish the P2P connection with the another communication device by the communication unit, and makes an attempt to establish the P2P connection with the another communication device again if the P2P connection is not established successfully.

12. The communication device according to claim 11, wherein the processing unit controls the communication unit to
transmit, by the communication unit, a first NAT device information related to the first NAT device; and
receive, by the communication unit, a second NAT device information related to a second NAT device correspondingly connected to the another communication device.

13. The communication device according to claim 12, wherein the processing unit further controls the communication unit to:
predict a first port used by the first NAT device to obtain a first predicted value;
determine a NAT type of the first NAT device;
predict a second port used by the second NAT device to obtain a second predicted value; and
determine a NAT type of the second NAT device.

14. The communication device according to claim 13, wherein the first NAT device information comprises a local IP address of the communication device, a local port of the communication device, a public IP address of the first NAT device, the first predicted value of the first NAT device and the NAT type of the first NAT device, and the second NAT device information comprises a local IP address of the another communication device, a local port of the another communication device, a public IP address of the second NAT device, the second predicted value of the second NAT device and the NAT type of the second NAT device.

15. The communication device according to claim 13, wherein it is feasible to establish the P2P connection with the another communication device by the communication unit is determined according to the first predicted value, the NAT type of the first NAT device, the second predicted value and the NAT type of the second NAT device.

16. The communication device according to claim 15, wherein the processing unit is configured to:
determine whether the first port is predictable according to the first predicted value; and
determine whether the second port is predictable according to the second predicted value;
wherein it is determined that it is feasible to establish the P2P connection if both the first port and the second port are predictable;
wherein it is determined that it is not feasible to establish the P2P connection if both the first port and the second port are unpredictable.

17. The communication device according to claim 16, wherein when one of the first port and the second port is predictable but the other is unpredictable, it is determined that it is not feasible to establish the P2P connection if the NAT type of the NAT device having a predictable port is symmetric or port restricted cone; and it is determined that it is feasible to establish the P2P connection if the NAT type of the NAT device having a predictable port is full cone or address restricted cone.

18. The communication device according to claim 11, wherein the processing unit controls the communication unit to:
exchange a third NAT device information with the another communication device by communication unit, wherein the third NAT device information comprises a local IP address of the communication device and a local port of the communication device; and
make an attempt to establish the P2P connection with the another communication device by the communication unit according to the third NAT device information.

19. The communication device according to claim 13, wherein the processing unit controls the communication unit to:
predict the first port used by the first NAT device again to obtain a third predicted value;
exchange a third NAT device information including the third predicted value with the another communication device by the communication unit; and
make an attempt to establish the P2P connection with the another communication device by the communication unit according to the third NAT device information.

20. The communication device according to claim 11, wherein the processing unit further controls the communication unit to:
disconnect the relay connection between the communication unit and the another communication device if the P2P connection is established successfully.

* * * * *